United States Patent Office 3,538,453
Patented Nov. 3, 1970

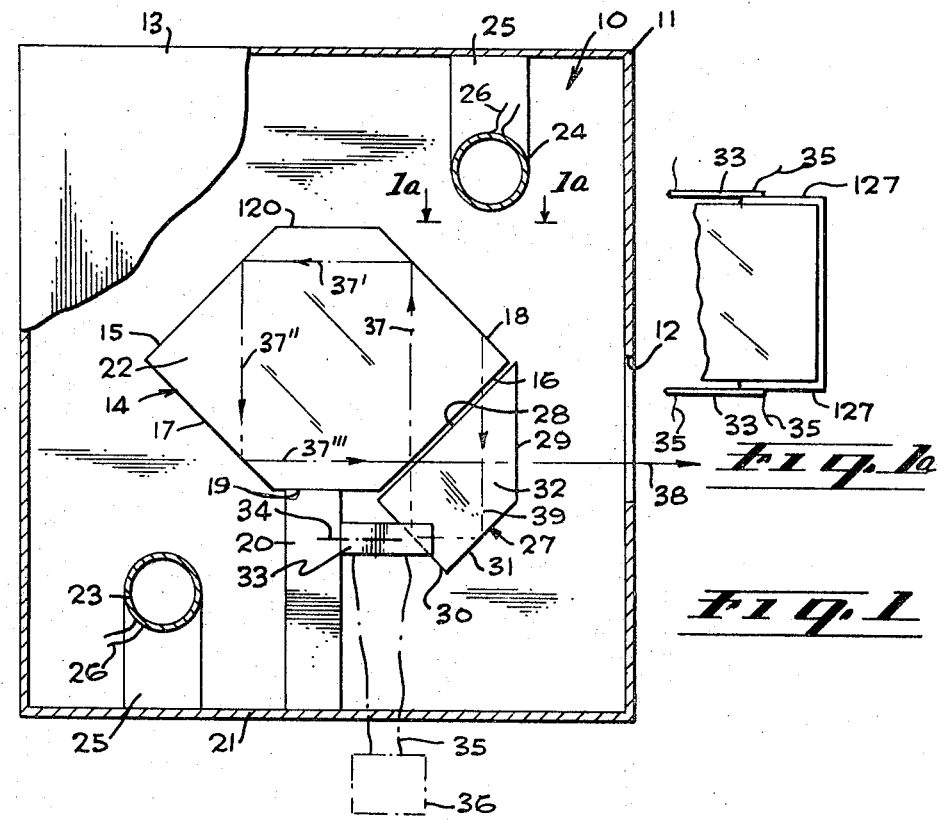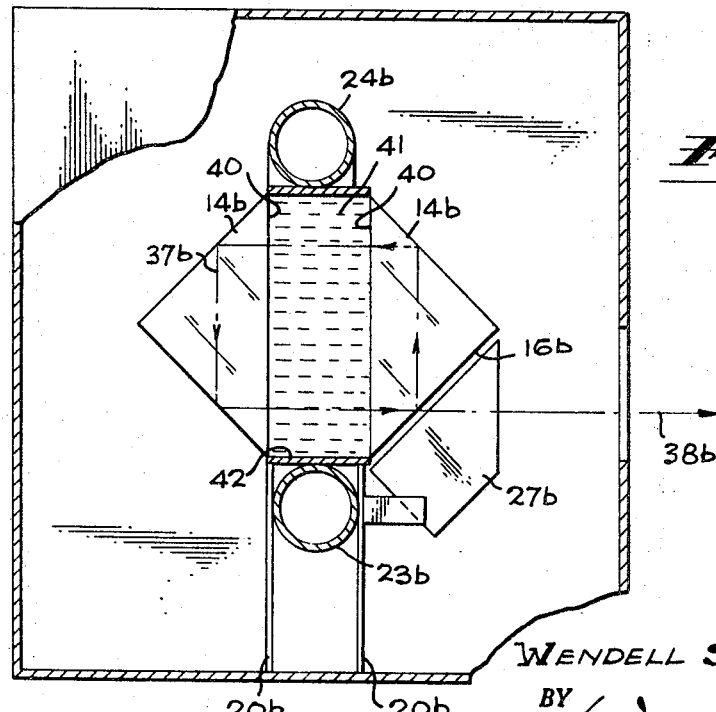

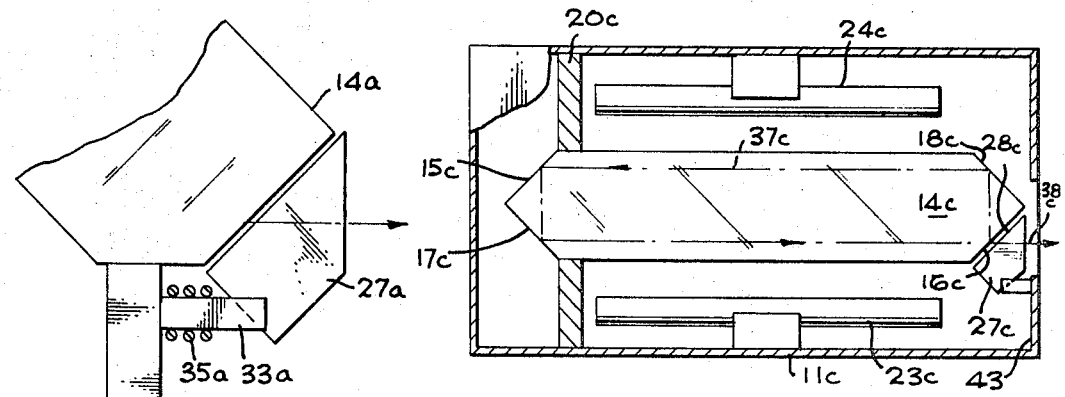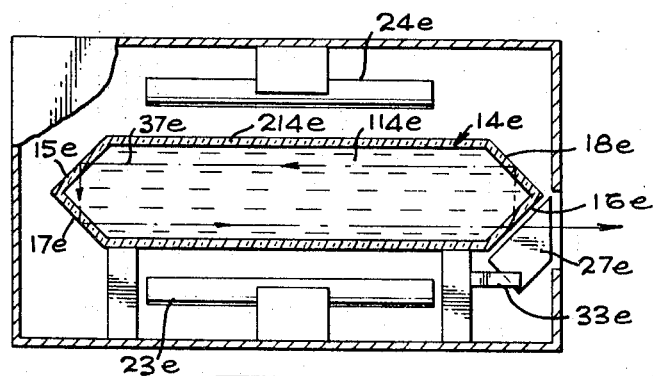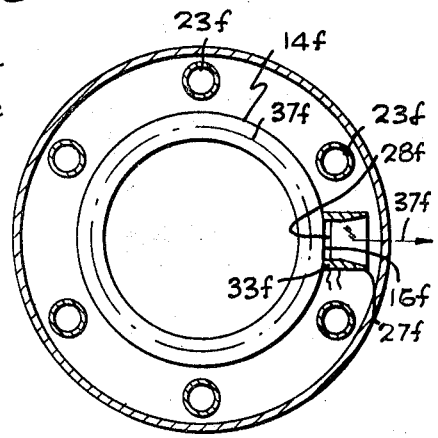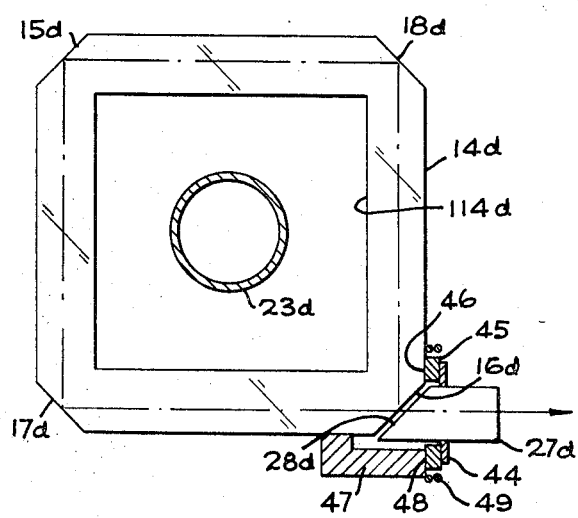

3,538,453
FRUSTRATED TOTAL INTERNAL REFLECTION LASER SYSTEM
Wendell S. Miller, 1341 Comstock Ave., Los Angeles, Calif. 90024
Continuation of application Ser. No. 490,769, Sept. 10, 1965, which is a continuation of application Ser. No. 217,103, Aug. 15, 1962. This application Nov. 28, 1966, Ser. No. 604,516
Int. Cl. H01s 3/00
U.S. Cl. 331—94.5          5 Claims

ABSTRACT OF THE DISCLOSURE

A laser within which stimulated emission is reflected by a series of surfaces along a closed path, and having a frustrating element located adjacent one of those surfaces and relatively movable to convert the device between a first condition in which that surface is totally internally reflective to direct the radiation along the closed path for rapid build-up, and a second condition in which the frustrating element moves close enough to the adjacent surface to frustrate its internally reflective characteristic and discharge the radiation therethrough to the exterior of the laser.

---

This application is a continuation of my application Ser. No. 490,769, filed Sept. 10, 1965, which itself is a continuation of my application Ser. No. 217,103, filed Aug. 15, 1962.

This invention relates to an improved laser device for producing a very high intensity coherent beam of light by stimulated emission.

Most conventional lasers utilize a Fabry-Perot interferometer arrangement for establishing the mode or direction in which the stimulated emission within the laser is aligned, and to achieve the above mentioned high intensity of coherent emission.

The fundamental laws of absorption and emission of radiation by transfer of energy between photons and atomic energy levels dictate the presence of some stimulated emission whenever there is a population in the upper energy level and a radiation flux. Such stimulated emission is preforce coherent with the microenvironment of flux which stimulated it. In ordinary optical media the laws of thermodynamics require a greater population in the lower of any two energy levels and thus absorption dominates this stimulated emission. By vigorous pumping the populations of two levels of different energy may be equalized or inverted resulting in a reversal of this situation and a tendency of the flux, if confined, to become predominately stimulated radiation. This situation, of itself alone, has not as yet found sufficient utility to justify the effort required to attain it. The valuable results which flow from this phenomenon further depend on the provision of mode selection means which enhance the growth of radiation intensity flowing in one or at most a small finite number of closely aligned modes at the expense of that in other competing possible modes.

If emitted light is present in an infinite number of modes of comparable intensity, the ensemble constitutes incoherent radiation. If the entire output is confined to a small finite number of closely aligned modes the output is said to be coherent.

Specifically, a conventional laser system usually includes a fully silvered mirror surface at one end of the lasing material, and a parallel partially silvered mirror surface at the opposite end, with the lasing material acting to produce a stimulated emission which is reflected back and forth between the two mirrors. A portion of this reflected emission passes through the partially silvered surface on each pass to emit from the apparatus. Such a surface thus does not prevent the escape of such emission from the laser structure.

In the conventional laser structure, it is of course necessary to allow such partial escape of the stimulated emission or radiation upon each pass, in order to provide some way for the emission to be discharged from the laser assembly. However, this very necessity for allowing escape of some of the radiation through the partially mirrored surface limits the results which can be achieved by the laser assembly, since the constant drain off of stimulated emission energy prevents the emission from building up to as great an extent or as rapidly in the crystal or other lasing material as would otherwise be possible. For example, if a particular laser crystal is capable of producing a particular percentage increase in the amount of aligned radiation within the crystal upon each full cycle of reflection of the emission, say a 19% build up, while the partially silvered mirror surface allows escape of 10% of the emission upon each pass (and the fully silvered surface may result in a 2% loss itself), the over-all gain in emission upon each full cycle of reflection back and forth within the crystal is actually only 7% (19% less 12%).

A major object of the present invention is to provide a laser structure in which the above disadvantages of conventional partially silvered emission escape surfaces are overcome so that the laser may operate more efficiently, attain a higher peak radiation output, and in other respects function more successfully than prior laser devices. In an arrangement embodying the invention, there is provided within the laser structure a closed path along which the stimulated emission may travel through a large number of cycles before any substantial radiation is permitted to escape from the system, and without the usual drain off of energy through a partially silvered reflector surface, so that the emission may build up rapidly to a very high peak. The apparatus is then actuable to a condition to suddenly allow escape of he high intensity stimulated emission from the laser along a predetermined path, at a controllable instant, with very high intensity and efficiency.

To achieve the above results, I utilize a laser structure having reflective surfaces defining the discussed closed emission path, and with at least one of those surfaces being a surface of "total reflection," as that term is understood in the optical arts, that is, this surface of total reflection is not a silvered or aluminized mirror surface, or the like, since some absorption losses necessarily occur at such surfaces; but instead, the surface of "total reflection" is one such as that produced at the interface between a crystal or glass body and a body of lower refractive index, when radiation strikes that surface from an angle greater than the critical angle. In such a case, no absorption losses result from the "total reflection" of the radiation. This is thus distinguished from usual metallic reflection in that with metallic reflection there is always associated a component of absorption. "Total reflection" is also referred to as "total internal reflection."

In conjunction with the surface of total reflection, I provide a body of glass or other material which is adapted when brought in close proximity to the surface of total reflection to frustrate the total reflection characteristics of that surface, and cause the transmission of radiation through the surface. This body may then be mounted for actuation between a position in which it is far enough away from the totally reflective surface to avoid frustration thereof, and a second or active position of sufficiently close proximity to the surface to convey emission or radiation therethrough. The frustrating body is left in the first position during the build up of stimulated emission within the laser structure, and is actuated to the second or frustrating position when it is desired to free the developed emission from the apparatus.

It is apparent that the laser structure here described and illustrated provides the mode selection means required to enhance development of a preferred mode, here corresponding to a plane wave. Further, it is an inherent feature of the planar face of the frustrating body that such a coherent plane wave as will be generated within the laser structure will be transmitted out as the intense coherent beam of light first mentioned above.

The above and other features and objects of the present invention will be better understood from the following detailed description of the typical embodiments illustrated in the accompanying drawings, in which:

FIG. 1 is a side view of a first form of laser embodying the invention;

FIG. 1a is taken on line 1a—1a of FIG. 1;

FIG. 2 is a fragmentary side view of a second form of the invention; and

FIGS. 3, 4, 5, 6 and 7 are views similar to FIG. 1, but showing five further forms of the invention.

Referring first to FIG. 1, I have represented at 10 a laser assembly embodying the invention and contained within a preferably opaque and typically rectangular housing 11, having an opening 12 in one of its sides through which the produced light beam may emit from the apparatus. One of the side walls 13 of the unit is broken away to reveal the inner apparatus.

The lasing material in the FIG. 1 arrangement is a block or crystal 14 formed of any substance having absorption and emission band structure capable of supporting stimulated emission, that is capable of "lasing." As will appear in discussion of some of the other forms of the invention, the lasing material utilized in devices embodying the invention may be either a solid as in FIG. 1, or a liquid if suitably contained. Consequently, it may be stated broadly that the lasing material should be a substance in condensed phase. To give an example of a typical material of which crystal 14 in FIG. 1 may be formed, this crystal may consist of a block of pink ruby, which as is known is capable of producing stimulated emission at a frequency of 6943 angstroms when stimulated by radiation of a frequency of 5600 angstroms.

As viewed from the side in FIG. 1, the block 14 of lasing material is of essentially square vertical cross-section, having a first pair of parallel planar surfaces 15 and 16, and a second pair of parallel planar surfaces 17 and 18 disposed perpendicularly to surfaces 15 and 16. Preferably, at least one corner of the block is cut off to form a window surface (such as surface 120 in FIG. 1) which is not parallel to or perpendicular to any of the main reflective surfaces 15, 16, 17 and 18. Any stimulated emission which is developed in the crystal but does not follow the desired emission mode (to be discussed later) will ultimately strike surface 120 at an angle allowing this undesired radiation to escape through surface 120 from the crystal.

The bottom corner of the square cross-section crystal may also be cut off at 19, so that the block 14 may be secured at that location to a support structure or column 20 projecting upwardly from the bottom wall 21 of housing 11. The described essentially square vertical cross-section of block 14 is uniform across the entire width of the block between two parallel vertical opposite side surfaces, one of which is visible to the viewer at 22. The surfaces 15, 16, 17 and 18 should be precisely planar or flat, to within $1/10$ of a wave length of the stimulated emission produced by crystal 14. Also the perpendicular sides of the square cross-section of block 14 should be at precisely 90 degree angles to one another.

Crystal 14 is stimulated by a suitable source of radiation at an appropriate absorption or stimulation frequency for the particular lasing material employed. Where block 14 is formed of pink ruby, as discussed above, the stimulating frequency may be supplied by conventional xenon light bulbs 23 and 24 mounted by suitable brackets 25 to the housing, and electrically energized through leads represented at 26.

Crystal 14 and the materials surrounding it are so selected as to cause the surfaces 15, 16, 17 and 18 to be internally totally reflective to the stimulated emission radiation when that radiation strikes surfaces 15, 16, 17 or 18 at a 45 degree angle. For this purpose, the surfaces 15, 16, 17 and 18 are left uncoated with any reflectorizing material or any other substance, and the lasing substance 14 is chosen to have an index of refraction relative to the material adjacent surfaces 15, 16, 17 and 18 of at least 2 at the emission frequency. If crystal 14 is formed of pink ruby, the material at the outside of and surrounding surfaces 15, 16, 17 and 18 may be air, since the index of refraction of ruby relative to air is in excess of the square root of two.

In close proximity to surface 16, there is mounted a body 27 of frustrating material, having a surface 28 which is precisely planar to within $1/10$ of a wave length of the stimulated emission, and should be exactly parallel to surface 16. At its opposite side, the body 27 has a vertical planar surface 29, while at its bottom, body 27 is defined by two mutually perpendicular planar surfaces 30 and 31, the first of which is perpendicular to surface 16, and the second of which is parallel to surface 16. At its front and back, body 27 may be defined by two parallel vertical surfaces lying in the same vertical planes as the corresponding front and rear surfaces of crystal 14. The front vertical surface of body 27 is for example illustrated at 32, and is in alignment with surface 22 of the crystal. The vertical cross-sectional configuration of body 27 as it appears in FIG. 1 is uniform between the discussed front and rear surfaces of this body.

Body 27 may be formed of any transparent material in condensed state, preferably a solid. It is contemplated that the most desirable substance of which to form block 27 is glass.

Frustrating element 27 is mounted from actuation toward and away from surface 16, to vary the spacing between surfaces 16 and 18 from a minimum spacing distance of $1/10$ wave length of the stimulated emission, or less, to a maximum spacing in excess of one full wavelength of that emission. To effect such movement of body 27, I may utilize two members 33 for mounting element 27 to support structure 20, with elements 33 being fixed at opposite ends to support 20 and side surfaces 127 of body 27, and being adapted to be lengthened and shortened at will along axis 34. For example, members 33 may be two identical piezoelectric crystals, to which electrical energy is fed through leads 35, to shift element 27 to the right from a position of minimum spacing between surfaces 16 and 28 to a position of maximum spacing therebetween.

Describing now the operation of the laser of FIG. 1, assume first of all that electrical energy is initially being fed from a source 36 through lead 35 to piezoelectric crystals 33, so that frustrating element 27 is maintained at a spacing from surface 16 of at least one wave length of the emission radiation characteristic of crystal 14, and preferably several wave lengths of that radiation. With element 27 in this condition surface 16 like the other surfaces 15, 17, and 18 is totally reflective to the emission radiation. Stimulating lamps 23 and 24 are then energized to produce a bright light some of which falls within the appropriate stimulation band for crystal 14, so that stimulated emission is produced within that crystal. This emission follows a closed path within interior of crystal 14, such as that represented by the broken lines 37. For example, this emission may pass upwardly above surface 16, strike surface 18 at a 45 degree angle to be reflected horizontally at 37′, then be reflected by surface 15 to pass downwardly at 37″ and be reflected again by surface 17 to extend horizontally toward surface 16 at 37‴. Similarly, other rectangular paths may be followed in which the radiation strikes the surfaces 15, 16, 17 and 18 at similar 45 degree angles of incidence. Also, the radiation may of course follow reverse closed paths within the crystal in a clockwise rather than counterclockwise direction. Since all of the surfaces 15, 16, 17 and 18 are totally reflective, no losses occur as a result of the reflections, and therefore the emission radiation may build up very rapidly and to an extremely high intensity peak.

After an interval has been allowed sufficient to reach a desired stimulated emission intensity within the crystal, the potential applied to piezoelectric elements 33 is turned off, allowing constriction of elements 33 and resultant movement of frustrating element 27 to the left in close enough proximity to surface 16 to frustrate the total reflection by that surface. Consequently, the stimulated emission following the closed path 37 and other closed paths within the crystal is now able to pass through surface 16 to the right as indicated by arrow 38, and form a high intensity coherent beam of light discharging from the unit in the direction of that arrow. The emission which is traveling in a clockwise direction within crystal 14 passes downwardly rather than rightwardly through surface 16 (as indicated at 39 in FIG. 1), is then reflected to the left by surface 31 and upwardly by surface 30 (or to the right by surface 30 and upwardly by surface 31) to re-enter crystal 14 traveling in a counterclockwise direction and thereby supplement the primary counterclockwise emission and discharge with that emission along path 38.

FIG. 2 represents fragmentarily another form of the invention which may be considered as identical with that of FIG. 1, except that the frustrating element 27a is actuated toward and away from crystal 14a by two magnetostrictive members 33a, rather than by piezoelectric elements. For example, members 33a may be magnetostrictive nickel rods, which are connected to opposite sides of element 27a in the same manner illustrated in FIG. 1a in connection with the first form of the invention, and are adapted to be extended and reduced in length by controlling the application of an electrical potential to inductive coils 35a disposed about the rods.

FIG. 3 shows another arrangement in which there is substituted for ruby crystal 14 of FIG. 1 a composite structure or assembly of similar cross-section but consisting of two glass non-lasing half cubes 14b having opposed parallel planar surfaces 40 between which there is confined a suitable lasing material 41, which may take the form of an appropriate liquid adapted to produce stimulated emission along paths corresponding to that designated 37b when stimulated by xenon tubes 23b and 24b. For assisting the blocks 14b in confining liquid 41, there may be provided glass walls 42 extending peripherally about the space within which the liquid is received, and sealing that space against the loss of any liquid therefrom. Lamps 23b and 24b are positioned to pass light of a stimulating frequency into the liquid through walls 42. The liquid may, as an example, be a 2% aqueous solution of sodium uranyl acetate, which may be stimulated by xenon bulbs. The supports for mounting the assembly consisting of half cubes 41b, walls 42, and the related parts, are illustrated as two upstanding columns 20b, relative to which frustrating element 27b is actuable between active and released positions by piezoelectric or other elements 33b.

When the FIG. 3 form of the invention is in use, frustrating element 27b is initially held far enough away from surface 16b to render that surface totally reflective to the stimulated emission, so that lamps 23b and 24b may be energized and stimulate liquid 41 to produce stimulated radiation along closed paths such as that designated 37b in FIG. 3. After an appropriate build up period, elements 33b are actuated to bring frustrating member 27b into close proximity to surface 16b, to frustrate the total reflectance by that surface, and cause discharge of the built up radiation energy along axis 38b.

In FIG. 4, the lasing element 14c may be a crystal similar to that of FIG. 1 except that the crystal is horizontally elongated, to provide a longer closed emission path such as that designated 37c. Crystal 14c may be stimulated by xenon lamps represented at 23c and 24c, with the crystal typically being mounted at its left end to the housing by supports 20c. The frustrating element 27c may be shaped the same as in the other forms of the invention, but instead of being mounted by electrically energized members for movement relative to the crystal, member 27c may be rigidly mounted to an end wall 43 of housing 11c, so that element 27c is stationary with respect to mounting support 20c and the left end of crystal 14c. The normal spacing between surfaces 16c and 28c is sufficient to render the crystal surface 16c totally reflective. However, when lamps 23c and 24c are turned on, and the stimulated emission within crystal 14c commences to build up, the resultant heating of the crystal causes its horizontal expansion, to reduce the spacing between surfaces 16c and 28c, ultimately to a point at which the close proximity of these surfaces frustrates the total reflection at surfaces 16c and allows the built up internal radiation at the emission frequency to discharge from the units along line 38c. While it is preferred that all of the reflective surfaces of the laser assemblies illustrated be totally reflective, it is contemplated that some of the advantages of the invention may be attained if only the discharge surface 16, 16b, 16c or the like is totally reflective and the other reflector at the right end may have aluminum or other reflectorizing coatings. For example, in FIG. 4, the two surfaces 15c and 17c at the left end of the device, and surface 18c at the right and may have aluminum or other reflectorizing coatings.

FIG. 5 shows an arrangement in which the lasing element or crystal 14d takes the form of a loop, which may be essentially square as viewed from the side, and contains a central space 114d within which exciting lamp 23d is positioned. Crystal 14d has its corners cut off to form four mutually perpendicular reflector surfaces 15d, 16d, 17d and 18d all desirably surfaces of total reflection. In association with the lasing element, there is provided a frustrating element 27d presenting a surface 28d in the same close proximity to surface 16d as has been discussed in connection with the other forms of the invention. Element 27d may have a flange portion 44 which is connected to a magnetostrictive ring 45, the opposite end of the ring being secured to crystal 14d at 46 and to a mounting bracket 47 at 48. An electromagnetic coil 49 is disposed about ring 45 and is electrically energizable to actuate element 27d toward and away from surface 16d, to determine when surfaces 16d and 28d are to be brought into close enough proximity to allow discharge of the stimulated radiation within crystal 14d from that crystal across surfaces 16d and 28d and along line 38d.

The arrangement shown in FIG. 6 is still another form of the invention in which the lasing unit 14e is essentially of the same shape as crystal 14c in FIG. 4, but contains a liquid lasing material 114e enclosed within a glass envelope or housing 214e whose surfaces 15e, 16e, 17e, and 18e have the same reflectance characteristics as surfaces 15, 16, 17 and 18 of FIG. 1. Xenon lamps 23e and 24e stimulate the liquid 114e to produce stimulated emission along paths such as that represented at 37e, with the ultimate discharge of the built up radiation from unit 14e being controlled by movement of a shiftable frustrating element 27e under the influence of magnetostrictive or piezoelectric elements 33e, or other shifting units.

The form of the invention shown in FIG. 7 includes an annular body or ring 14f formed of pink ruby crystal or other lasing material, and adapted to be stimulated by lamps 23f. The ring 14f functions as a wave guide acting to guide the stimulated emission along a closed circular path such as that represented at 37f. The surfaces of ring 14f are all totally reflective and uncoated to avoid reflection losses. At one point about the periphery of ring 14f, there is a frustrating element 27f, having a surface 28f which is initially far enough away from an opposed planar surface area 16f on ring 14f to render surface 16f totally reflective, but is shiftable into close enough proximity to that surface to frustrate the total reflection and allow the stimulated emission following path 37f to emit through surfaces 16f and 28f and element 27f for discharge from the assembly. Such actuation of element 27f, from right to left as seen in FIG. 7, is effected by a piezoelectric or magnetostrictive ring 33f connected at its opposite ends to elements 14f and 27f respectively.

I claim:

1. The combination comprising a laser structure itself comprising a first body of lasing material, said structure provided with a plurality of planar reflective surfaces defining a confined path of radiation transmission traversing said first body, one of said surfaces being a surface of total reflection, said combination further comprising means for stimulating emission in said lasing material, said material being heated by the operation of said stimulating means, said combination further comprising a frustrating body and a mount therefor, said frustrating body being provided with an input surface for the input of stimulated emission into said frustrating body and an output surface positioned with respect to said input surface to permit refraction out therefrom of said radiation, said mount connecting said structure and said frustrating body and holding them with said one surface and said input surface in proximate juxtaposition at a separation of over one wavelength of said emission in the absence of stimulation acting on said material, said mount further constructed to reduce the separation of said last mentioned pair of surfaces to less than one wavelength of said emission upon the heating of said material by the operation of said stimulating means.

2. The combination comprising a laser structure having a plurality of planar reflective surfaces defining a confined path along which stimulated emission is reflected through repeated cycles, said structure including a lasing material capable of producing stimulated emission along said path, means for stimulating said emission, all of said plurality of planar reflective sufaces being positioned to reflect said stimulated emission repeatedly as it travels through successive cycles along said path to thereby develop a coherent mode of emission propagation along said path, one of said planar reflective surfaces being a surface of total internal reflection with respect to said stimulated emission following said path, and a frustrating body positioned after the development of said coherent mode of propagation to convey said stimulated emission across said surface of total internal reflection coherently by closely proximate juxtaposition of said body to said surface, said one surface and said frustrating body being relatively movable between a first condition in which they are far enough apart, during development of said mode, to render said one surface totally internally reflective to said emission and to thereby prevent escape through said one surface of any of said emission which is following said path, and a second condition in which said one surface and said frustrating body are close enough together to frustrate such total internal reflection and convey said emission in said coherent mode out of said path as a coherent beam of radiation.

3. A combination as set forth in claim 2, wherein all of said plurality of planar reflective surfaces are surfaces of total internal reflection with respect to said stimulated emission and said path.

4. The combination as set forth in claim 2, wherein said frustrating body is provided with a planar refractive surface, and means for moving said frustrating body with respect to said one surface between said two conditions while maintaining said one surface and said refractive surface co-parallel to each other.

5. The combination comprising a laser structure having a plurality of reflective surfaces defining a confined path along which stimulated emission is reflected through repeated cycles, said structure including a lasing material capable of producing stimulated emission along said path, means for stimulating said emission, all of said plurality of reflective surfaces being positioned to reflect said stimulated emission repeatedly as it travels through successive cycles along said path to thereby develop a coherent mode of emission propagation along said path, one of said reflective surfaces being a surface of total internal reflection with respect to said stimulated emission following said path, and a frustrating body positioned after the development of said coherent mode of propagation to convey said stimulated emission across said surface of total internal reflection coherently by closely proximate juxtaposition of said body to said surface, said one surface and said frustrating body being relatively movable between a first condition in which they are far enough apart, during development of said mode, to render said one surface totally internally reflective to said emission and to thereby prevent escape through said one surface of any of said emission which is following said path, and a second condition in which said one surface and said frustrating body are close enough together to frustrate such total internal reflection and convey said emission in said coherent mode out of said path as a coherent beam of radiation.

References Cited

UNITED STATES PATENTS

| | | | |
|---|---|---|---|
| 3,243,724 | 3/1966 | Vuylsteke | 331—94.5 |
| 3,308,395 | 3/1967 | Sorokin | 331—94.5 |
| 2,565,514 | 8/1951 | Pajes | 88—61 |
| 2,455,763 | 12/1948 | Harrison. | |
| 2,997,922 | 8/1961 | Kaprelian. | |
| 3,140,451 | 7/1964 | Fox. | |
| 3,035,492 | 5/1962 | Blythe. | |

FOREIGN PATENTS

| | | |
|---|---|---|
| 1,006,804 | 10/1965 | Great Britain. |

OTHER REFERENCES

Bergstein: "A Total-Reflection Solid-State Optical-Maser Resonator," Proc. of the I.R.E., vol. 50, No. 8, August 1962, p. 1833, TK 5700 17.

RONALD L. WIBERT, Primary Examiner

PAUL K. GODWIN, JR., Assistant Examiner